United States Patent [19]
Hirose

[11] 4,386,828
[45] Jun. 7, 1983

[54] TELECENTRIC ILLUMINATION SYSTEM
[75] Inventor: Hideo Hirose, Tokyo, Japan
[73] Assignee: Nippon Kogaku K. K., Tokyo, Japan
[21] Appl. No.: 263,174
[22] Filed: May 13, 1981
[30] Foreign Application Priority Data
   May 26, 1980 [JP] Japan ................................. 55-68997
[51] Int. Cl.³ ..................... G02B 13/22; G02B 15/16; G02B 21/06
[52] U.S. Cl. .................................. 350/427; 350/415; 350/519
[58] Field of Search ............... 350/427, 415, 519, 523, 350/524

[56] References Cited
U.S. PATENT DOCUMENTS
   3,399,014  8/1968  Butterfield et al. ................ 350/427
   3,549,230  12/1970  Kato et al. ........................ 350/519

Primary Examiner—John K. Corbin
Assistant Examiner—Rebecca D. Gass
Attorney, Agent, or Firm—Shapiro and Shapiro

[57] ABSTRACT

An illumination system for telecentric illumination throughout a wide variation range of magnification while keeping a large distance to an object to be illuminated is disclosed. The telecentric illumination system comprises a first lens group which is convergent and remains fixed when the magnification is varied; a second lens group which is divergent and movable along the the optical axis; a third lens group which is convergent and movable along the optical axis; a fourth lens group which is convergent and remains fixed when the magnification is varied; and a light source located at the focal point of the fourth lens group. The second and third lens groups are moved along the optical axis in a determined relation so as to make an imge of the light source formed between the first and third lens groups thereby changing the state of illumination between that for high magnification and that for low magnification.

5 Claims, 7 Drawing Figures

TELECENTRIC ILLUMINATION SYSTEM

BACKGROUND OF THE INVENTION

1. Field of the Invention

The present invention relates to a telecentric illumination system and more particularly to a zoom type of telecentric illumination system capable of continuously changing the area illuminated.

2. Description of the Prior Art

Hitherto, telecentric illumination system has been often used in an optical instrument such as projection examining instrument in order to minimize the affection of focusing error on measurement. Also, in order to obtain always bright projected images irrespective of change of magnification of the objective, various systems for the variation of magnification have been proposed one example of which is the zooming system capable of changing the illuminated area with the change of magnification of the objective lens. However, in general, the objection examining instrument or the like has a particular structure which requires a relatively large distance from the illumination lens to the surface of a sample to be examined, that is, to the focal plane of the projection lens. This requirement constitutes a difficult problem in designing the illumination system useful for such optical instruments. In particular, conventional illumination systems have a problem of inability to effectively use marginal rays of the illumination light.

FIGS. 1A–1C illustrate an example of the conventional arrangement of illumination system wherein FIG. 1A shows the state of illumination for high magnification, FIG. 1B for medium magnification and FIG. 1C for low magnification. As seen in FIGS. 1A–1C, marginal rays available for illumination are gradually decreased with the change of magnification toward high magnification at which the area of sample surface (O) to be illuminated is narrowed. Therefore, the efficiency of illumination is reduced accordingly for high magnification. More particularly, in the case of medium magnification (FIG. 1B) and low magnification (FIG. 1C) the composite focal length of the total illumination system is relatively long and the beam diameter of the illumination light running from the light source (S) to the sample surface (O) is large. In addition, the angle which oblique rays indicated by broken lines forms with the optical axis is relatively small. Consequently, the shortage of marginal rays on the sample surface (O) is not so great in these cases.

In contrast, in the case of high magnification (FIG. 1A), the composite focal length is short and the beam diameter becomes small. The angle which the principal ray (P) of the oblique beam forms with the optical axis is large. The oblique rays are entirely off the sample surface (O) and therefore the efficiency of illumination is reduced to a great extent in this case.

To solve the problem of such poor illumination efficiency for high magnification, most of the conventional apparatus have been obliged practically to employ a condensing illumination system for convenience' sake. However, since the solution can not hold the condition of telecentric illumination, such illumination system has never been satisfactory, in particular, for high precision instruments such as optical measuring instruments.

SUMMARY OF THE INVENTION

Accordingly, it is the principal object of the invention to provide an illumination system which enables to eliminate the drawbacks mentioned above and with which telecentric illumination can be performed always with high efficiency throughout a wide variation range of magnification ranging from low magnification to high magnification while maintaining a sufficiently large distance between the illumination lens and the sample surface.

To attain the object according to the present invention there is provided a telecentric illumination system comprising a converging first lens group, a diverging second lens group, a converging third lens group, a converging fourth lens group and a light source located at the focal point of the fourth group, arranged in this order as viewed from the side of a sample, that is, an object to be illuminated. The second and third groups are moved along the optical axis while forming an image of the light source at a point between the first and third groups thereby continuously changing the state of telecentric illumination between that for high magnification and that for low magnification.

More concretely, in the case of high magnification wherein an image of the light source is formed between the first and second groups by the second, third and fourth groups, the second and third groups are displaced while making the position of the light source image coincident with the focal point on the side of light source of the first group. In the case of low magnification wherein the second group comes nearer the first group, goes across the light source image and the image of the light source is then formed between the second and third groups by the third and fourth groups, the second and third groups are continuously displaced while making the position of the light source image coincident with the focal point on the light source side of the composite system resulting from the first and second groups.

Other and further objects, features and advantages of the invention will appear more fully from the following detailed description with reference to the accompanying drawings.

DESCRIPTION OF THE PREFERRED EMBODIMENT

FIGS. 2A–2D show the fundamental arrangement of an embodiment of the invention. As shown in FIGS. 2A–2D, the illumination system is composed of a first lens group $L_1$, second lens group $L_2$, third lens group $L_3$ and a fourth lens group $L_4$ arranged in this order as viewed from the side of an object to be illuminated (O). The first group is convergent and stationary. The second group is divergent and movable along the optical axis. The third one is convergent and movable along the optical axis. The fourth group is convergent and stationary. A light source S is located at the focal point of the fourth group $L_4$. By locating the light source at the position, a parallel system is provided between the third and fourth groups $L_3$ and $L_4$ and an image of the light source S is once formed between the first and third groups $L_1$ and $L_3$ within the lens system. The formed image of the light source is designated by S' in FIG. 2.

Figure 1A:
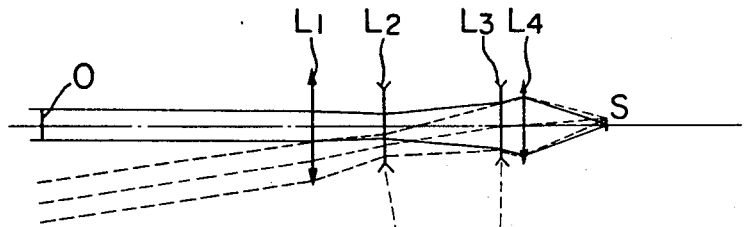
FIGS. 1A–1C illustrate an example of the conventional arrangements of illumination system.
Figure 1B:
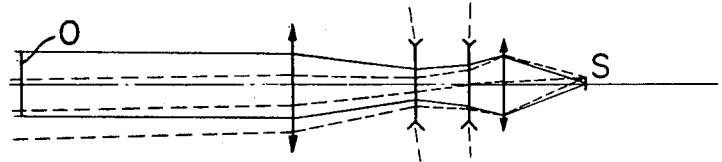
Figure 1C:
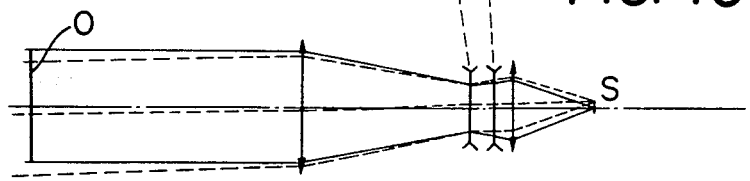
Figure 2A:
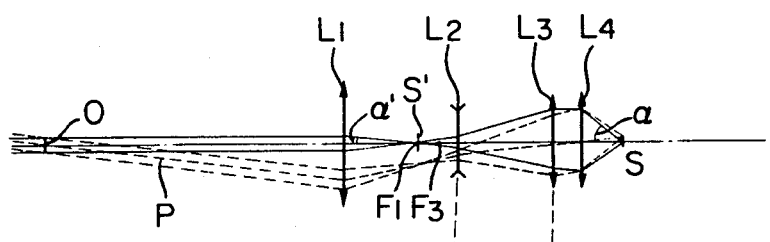
FIGS. 2A–2D illustrate the arrangement of a telecentric illumination system in accordance with the present invention.

FIG. 2A illustrates the position for high magnification illumination in which a high magnification projection lens (not shown) is used. In this position, in accordance with the principle of the invention, the second group $L_2$ is located between the focal point $F_3$ on the illuminated object side of the third group $L_3$ and the position of the third group. Also, in this position, a light source image S' is formed at the focal point $F_1$ on the light source side of the first group $L_1$. The principal ray P of oblique rays indicated by broken lines reaches the center of surface of the object O. For this position of the system, the magnification $\beta$ of the formed image S' of the light source is given by:

$$\beta = f_{23}/f_4$$

wherein, $f_{23}$ is the composite focal length resulting from the second and third groups $L_2$ and $L_3$ and $f_4$ is the focal length of the fourth group $L_4$. Let $\alpha$ denote the angle of divergence of the beam on the light source side and $\alpha'$ that of the beam on the light source image side. Then, $\tan \alpha' = 1/\beta \tan \alpha$. Therefore, providing that the position of the light source image is coincident with the focal point of the first group $L_1$, the diameter of the illuminated visual field, $\phi$ is given by:

$$\phi = f_1 \cdot \tan \alpha'.$$

Since the effective visual field for low magnification is usually relatively large, the minimum value of the focal length $f_1$ of the first group must be limited in order to keep aberrations within a preferred range. For this reason, in order to approximate the beam diameter of illumination light to the narrow visual field for high magnification as much as possible so as to attain the purpose of effective illumination, it is required that the magnification $\beta$ of light source image be large and that the angle of divergence $\alpha'$ be small. According to the invention, this can be realized in a simple manner by suitably determining the focal lengths of the second and third groups $L_2$ and $L_3$ as well as the distance between the two groups $L_2$ and $L_3$.

As previously noted, for illumination at high magnification it is necessary to fully use the light including even the marginal rays as illumination beam. To achieve it, the exit pupil should be formed in the vicinity of the surface of the object (O). In the case of the lens system in accordance with the invention, the effective use of all beams of light may be realized advantageously by providing a stop or its equivalent in the vicinity of the fourth group $L_4$ that is the nearest one to the light source S and forming an image of the stop or its equivalent in the vicinity of the surface of the object (O). In practice, the aperture of the fourth group $L_4$ itself plays the role of such stop.

In the arrangement according to the invention, the divergent refractive power of the second group becomes relatively high to obtain a large variation ratio of magnification. Therefore, when the system is in the position in which a high magnification lens is used, the image (virtual image) of the stop formed by the composite system resulting from the second and third groups $L_2$ and $L_3$ lies in the vicinity of the second group at a position on the side of the third group. The image of the stop formed by the first group $L_1$ lies in a position far distant from the focal point on the object side of the first group. Since the image of the stop is formed in a position far away from the focal point of the first group $L_1$, it is made possible to get the position of the exit pupil substantially coincident with the object plane even when there is set a sufficiently large distance from the first group $L_1$ to the object plane (O) as required for a projection examining instrument.

Figure 2B:
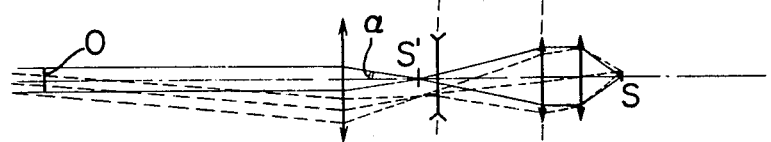

The distance between the second and third groups $L_2$ and $L_3$ is increased with changing of the magnification toward low magnification side as illustrated in FIG. 2B. Also, the second and third groups are individually moved in such manner as to make the light source image S' coincident with the focal point $F_1$ of the first group $L_1$. This increase of the distance between $L_2$ and $L_3$ results in decrease of the focal length $f_{23}$ of the composite system of $L_2$ and $L_3$ which, in turn, reduces the magnification $\beta$ of the light source image. Therefore, the angle of divergence $\alpha'$ of the beam on the side of the light source image becomes larger and there is obtained a larger illuminating beam as required for illumination at low magnification.

Figure 2C:
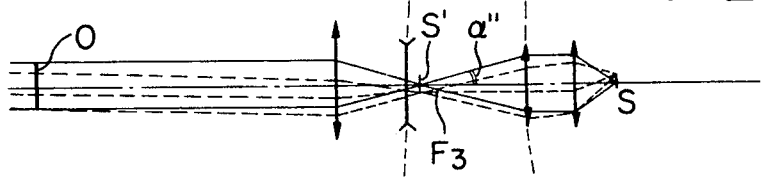
Figure 2D:
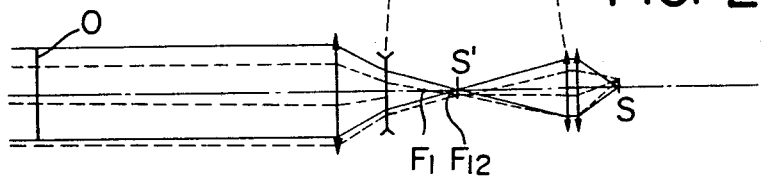

Generally, in projection examining instruments, the magnification is variable in a wide range of from low magnification to high magnification. Therefore, to provide the projection examining instrument with an optimum illumination at every selected magnification, the illumination system also needs to have a wide variation range for magnification. To achieve the necessary wide variation range of magnification in the arrangement according to the invention, the illumination system is so formed as to allow the second group $L_2$ to move beyond the focal point $F_1$ of the first group $L_1$ as seen in FIGS. 2C and 2D. The second and third groups are moved in such manner as to make the light source image S' coincident with the focal point $F_{12}$ of the composite system resulting from the first and second groups $L_1$ and $L_2$. In this case, the magnification $\beta'$ of the light source image is given by:

$$\beta' = f_3/f_4 = \text{constant } (<\beta)$$

wherein, $f_3$ is the focal length of the third group $L_3$.

As for the angle of divergence $\alpha''$ of the beam on the side of light source image, $$\tan \alpha'' = (1/\beta') \cdot \tan \alpha (\alpha'' > \alpha).$$

The diameter $\phi'$ of the visual field illuminated at this time is given by:

$$\phi' = f_{12} \cdot \tan \alpha''$$

wherein $f_{12}$ is the focal length of the composite system resulting from $L_1$ and $L_2$.

Consequently, the diameter $\phi'$ increases with increase of $f_{12}$ resulted from decreasing of the distance between the first and second groups $L_1$ and $L_2$.

Among the four positions shown in FIGS. 2A–2D, the position in which oblique rays can correctly reach the center of the object plane (O) is only the position FIG. 2A for high magnification. However, even in other positions FIG. 2B, FIG. 2C and FIG. 2D for lower magnifications, the marginal area of the object surface can be illuminated sufficiently for practical purpose because the beam diameter becomes larger and the angle of oblique rays becomes smaller in these positions. Therefore, with the arrangement of the illumination system in accordance with the invention, the object to be examined can be effectively illuminated not only at high magnification but also at low magnification. Further, since in the arrangement according to the invention the second group $L_2$ can be moved beyond the focal point of the first group $L_1$, the illumination system has a wider variation range of magnification than the conventional ones. Numerical aperture (N.A.) of the illumination system varies depending upon the size of the illuminated visual field.

As a concrete example of the illumination system described above with reference to FIGS. 2A-2D, numerical data relating to the respective groups' share of power are shown in the following table in which $L_1$, $L_2$, $L_3$ and $L_4$ are again the first, second, third and fourth lens groups and $f_1$, $f_2$, $f_3$ and $f_4$ are focal lengths of the groups respectively:

| Magnification Variation Ratio 7.6 |
| --- |
| $f_1 = 90.0$ |
| $f_2 = -28.8$ |
| $f_3 = 128.6$ |
| $f_4 = 45.0$ |

| | First position (FIG. 2A) for high magnification | Second position (FIG. 2B) for medium-high magnification | Third position (FIG. 2C) for medium-low magnification | Fourth position (FIG. 2D) for low magnification |
| --- | --- | --- | --- | --- |
| Distance between $L_1$ and $L_2$ | 131.3 | 111.6 | 83.2 | 70.4 |
| Distance between $L_2$ and $L_3$ | 111.6 | 116.2 | 137.4 | 189.8 |
| Distance between $L_3$ and $L_4$ | 23.6 | 38.7 | 45.9 | 6.3 |

As readily understood from the foregoing, the present invention provides a telecentric illumination system which allows to change the magnification in a wide range ranging from low magnification to high magnification while maintaining a sufficiently large distance to an object to be illuminated and which assures always good and highly effective telecentric illumination throughout the wide variation range of magnification. The telecentric illumination system has various applications. When it is adopted in a projection examining instrument which is usually used in a relatively light place, the sample can be well and brightly illuminated and always good observation can be assured even with a high magnification projection lens of the instrument. The illumination system according to the invention may be used also in a factory microscope and similar instruments which need telecentric illumination if the above shown embodiment is slightly modified. Of course, it is useful also as an illumination system for a common microscope while suitably selecting the relation between N.A. and visual field.

While the invention has been particularly shown and described with reference to a preferred embodiment thereof, it will be understood by those skilled in the art that the foregoing and other changes in form and details can be made thereon without departing from the spirit and scope of the invention.

I claim:

1. An illumination system for performing telecentric illumination throughout a wide variation range of magnification while maintaining a large distance to an object to be illuminated, said illumination system comprising:
   a converging first lens group remaining fixed when the magnification is varied;
   a diverging second lens group movable along the optical axis;
   a converging third lens group movable along the optical axis;
   a converging fourth lens group remaining fixed when the magnification is varied; and
   a light source located at the focal point of said fourth group,
   said first to fourth groups and said light source being arranged in this order as viewed from the side of said object, and said second and third groups are moved along the optical axis in a determined relation in such manner as to make an image of said light source formed between said first and third groups thereby changing the state of illumination between that for high magnification and that for low magnification.

2. An illumination system as set forth in claim 1, wherein said second and third groups can be moved along the optical axis in such manner that when said light source image lies between said first and second groups, the position of said image may be coincident with the focal point on the light source side of said first group and when said image lies between said second and third groups, the position of said image may be coincident with the focal point on the light source side of the composite system resulting from said first and second groups.

3. An illumination system as set forth in claim 2 wherein said first to fourth lens groups have the following numerical data:

| Magnification Variation Ratio 7.6 |
| --- |
| $f_1 = 90.0$ |
| $f_2 = -28.8$ |
| $f_3 = 128.6$ |
| $f_4 = 45.0$ |

| | First position (FIG. 2A) for high magnification | Second position (FIG. 2B) for medium-high magnification | Third position (FIG. 2C) for medium-low magnification | Fourth position (FIG. 2D) for low magnification |
| --- | --- | --- | --- | --- |
| Distance between $L_1$ and $L_2$ | 131.3 | 111.6 | 83.2 | 70.4 |
| Distance between $L_2$ and $L_3$ | 111.6 | 116.2 | 137.4 | 189.8 |
| Distance between $L_3$ and $L_4$ | 23.6 | 38.7 | 45.9 | 6.3 | wherein, $L_1$, $L_2$, $L_3$ and $L_4$ stand for the first, second, third and fourth lens groups respectively and $f_1$, $f_2$, $f_3$ and $f_4$ stand for the focal lengths of said first, second, third and fourth lens groups respectively.

4. A telecentric illumination system in which the range of area illuminated is variable from a narrow area of the surface of an objected to be illuminated to a large area thereof, said telecentric illumination system comprising:

a converging first lens group remaining fixed when the magnification is varied;

a diverging second group and a converging third lens group which can be moved along the optical axis relative to each other in a determined relation; and light source means for providing said third group with parallel beams of light, said second and third groups being moved in such manner that said parallel beams coming from said light source means may be focused between said first and third groups thereby effectively changing said illuminated area.

5. A telecentric illumination system as set forth in claim 4 wherein said light source means includes a converging lens group and a light source located at the focal point of said converging lens group, wherein, $L_1$, $L_2$, $L_3$ and $L_4$ stand for the first, second, third and fourth lens groups respectively and $f_1$, $f_2$, $f_3$ and $f_4$ stand for the focal langths of said first, second, third and fourth lens groups respectively.

* * * * *